(12) United States Patent  
Kawaguchi

(10) Patent No.: US 9,202,091 B2
(45) Date of Patent: Dec. 1, 2015

(54) RFID READER WITH CAMERA, VIDEO, AND/OR AUDIO CAPTURE DEVICE

(75) Inventor: Dean Kawaguchi, San Jose, CA (US)

(73) Assignee: Intelleflex Corporation, San Jose, CA (US)

( * ) Notice: Subject to any disclaimer, the term of this patent is extended or adjusted under 35 U.S.C. 154(b) by 121 days.

(21) Appl. No.: 13/224,192

(22) Filed: Sep. 1, 2011

(65) Prior Publication Data

US 2012/0056722 A1 Mar. 8, 2012

Related U.S. Application Data

(60) Provisional application No. 61/379,689, filed on Sep. 2, 2010.

(51) Int. Cl.
*G06K 7/01* (2006.01)
*G06K 7/10* (2006.01)

(52) U.S. Cl.
CPC .................. *G06K 7/10009* (2013.01)

(58) Field of Classification Search
CPC .......... G06K 7/10009; G06K 17/0022; G06K 2017/0045; G08B 13/248; G08B 13/2417; G08B 13/19608; G08B 13/1963; G07C 9/00111; G07C 9/00071

USPC ......... 340/10.1, 10.2, 10.3, 10.4, 10.5, 572.1, 340/572.3, 572.4; 348/135, 143

See application file for complete search history.

(56) References Cited

U.S. PATENT DOCUMENTS

| | | | |
|---|---|---|---|
| 2004/0100383 A1* | 5/2004 | Chen et al. .................. | 340/572.1 |
| 2006/0022814 A1* | 2/2006 | Nogami et al. ............... | 340/505 |
| 2007/0031010 A1* | 2/2007 | Sukegawa et al. ............ | 382/118 |
| 2007/0097211 A1* | 5/2007 | Washington ................... | 348/135 |
| 2007/0126586 A1* | 6/2007 | Ohtaka ......................... | 340/572.7 |
| 2009/0156153 A1* | 6/2009 | Al-Mahdawi ................. | 455/296 |
| 2009/0167502 A1* | 7/2009 | Erickson et al. ............. | 340/10.3 |
| 2009/0243794 A1* | 10/2009 | Morrow ....................... | 340/5.52 |
| 2009/0267743 A1* | 10/2009 | Faroe et al. .................. | 340/10.1 |
| 2009/0322537 A1* | 12/2009 | Tapp et al. ................... | 340/572.4 |
| 2010/0315235 A1* | 12/2010 | Adegoke et al. ........... | 340/568.1 |
| 2011/0254685 A1* | 10/2011 | Karasek et al. ............... | 340/540 |

* cited by examiner

Primary Examiner — Nabil Syed
(74) Attorney, Agent, or Firm — Zilka-Kotab, PC

(57) ABSTRACT

A media capture device coupled to an RFID reader and/or antenna. A system in one embodiment includes a Radio Frequency Identification (RFID) reader; an antenna coupled to the RFID reader; and a media capture device coupled to at least one of the reader and the antenna. A method in another embodiment includes capturing media using a media capture device coupled to at least one of a Radio Frequency Identification (RFID) reader and an antenna coupled to the RFID reader upon occurrence of a trigger event.

20 Claims, 3 Drawing Sheets

RFID READER WITH CAMERA, VIDEO, AND/OR AUDIO CAPTURE DEVICE

RELATED APPLICATION

This application claims priority to U.S. Provisional Patent Appl. No. 61/379,689, filed Sep. 2, 2010, and which is herein incorporated by reference.

FIELD OF THE INVENTION

The present invention relates to Radio Frequency (RF) systems, and more particularly, this invention relates to Radio Frequency Identification (RFID) readers with attached and/or integrated camera, video and/or audio capture device and/or recorder.

BACKGROUND

Cameras are used to record events on a continuous basis, but finding a specific event may require a significant amount of time to scan through recorded media. Moreover, cameras are typically statically mounted, or follow a preset panning path. Nefarious individuals who can anticipate the camera's field of view may be able to avoid having their image recorded.

BRIEF SUMMARY

A system in one embodiment includes a Radio Frequency Identification (RFID) reader; an antenna coupled to the RFID reader; and a media capture device coupled to at least one of the reader and the antenna.

A method in another embodiment includes capturing media using a media capture device coupled to at least one of a Radio Frequency Identification (RFID) reader and an antenna coupled to the RFID reader upon occurrence of a trigger event.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a system includes a Radio Frequency Identification (RFID) reader; an antenna coupled to the RFID reader; and a media capture device coupled to at least one of the reader and the antenna.

In one general embodiment, a method includes capturing media using a media capture device coupled to at least one of a Radio Frequency Identification (RFID) reader and an antenna coupled to the RFID reader upon occurrence of a trigger event.

Figure 1:
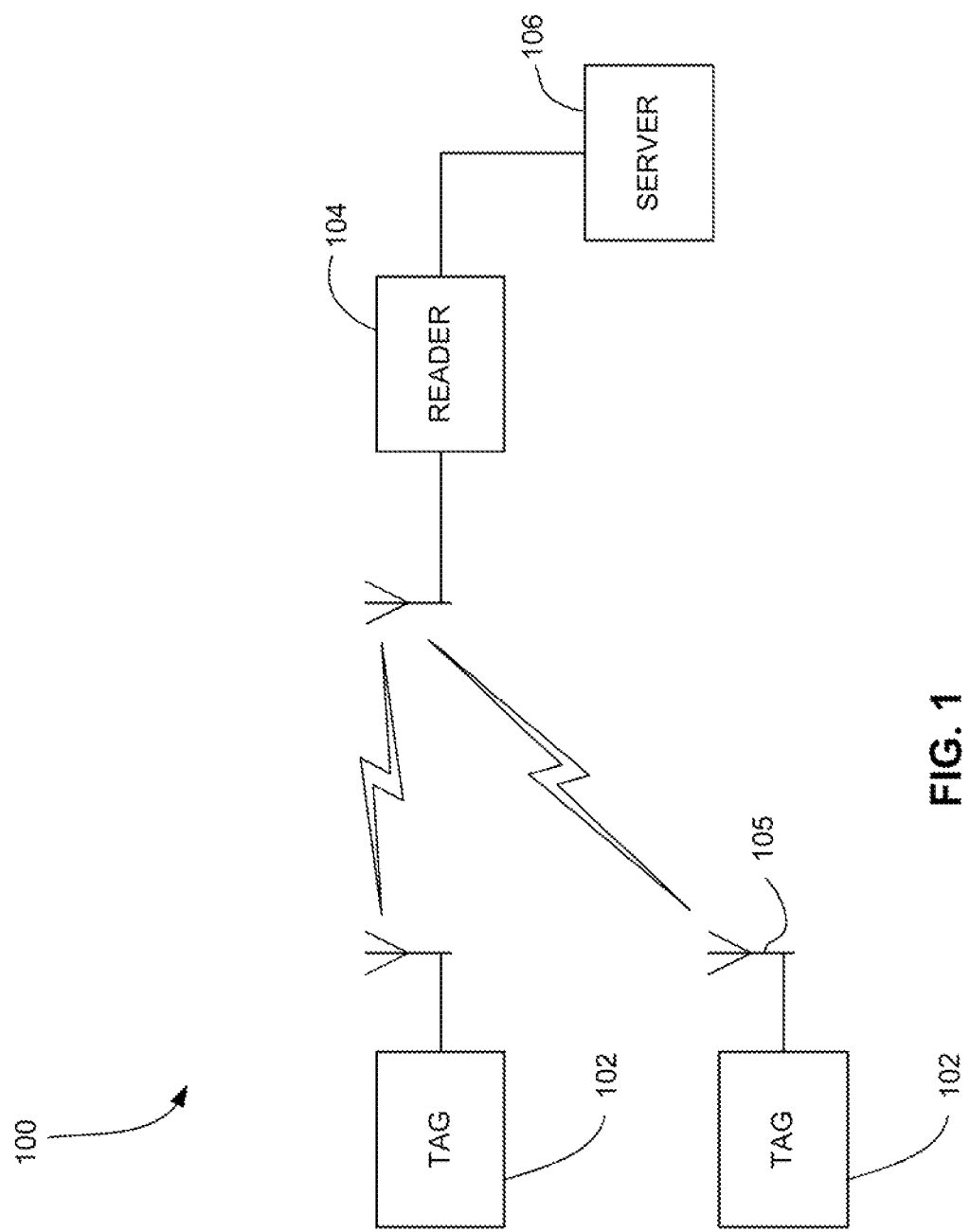
FIG. 1 is a system diagram of an RFID system.

FIG. 1 depicts an RFID system 100 according to one of the various embodiments, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator and/or transmitter to send data back to the reader; anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

Each of the RFID devices 102 may be coupled to an object or item, such as an article of manufacture, a container, a device, a person, etc.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader 104.

The system 100 may also include an optional backend system such as a server 106, which may include databases containing information and/or instructions relating to RFID tags and/or tagged items.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:
1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:

Class-1
Identity tags (RF user programmable, range ~3 m)
Lowest cost
Class-2
Memory tags (20 bit address space programmable at ~3 m range)
Security & privacy protection
Low cost
Class-3
Semi-passive tags (also called semi-active tags and battery assisted passive (BAP) tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~300 to ~1,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to find a particular RFID device, e.g., tag via singulation or any other method known in the art. The radio wave hits the RFID device, and the RFID device recognizes the remote device's signal and may respond thereto. Such response may include exiting a hibernation state, sending a reply, storing data, etc.

Figure 2:
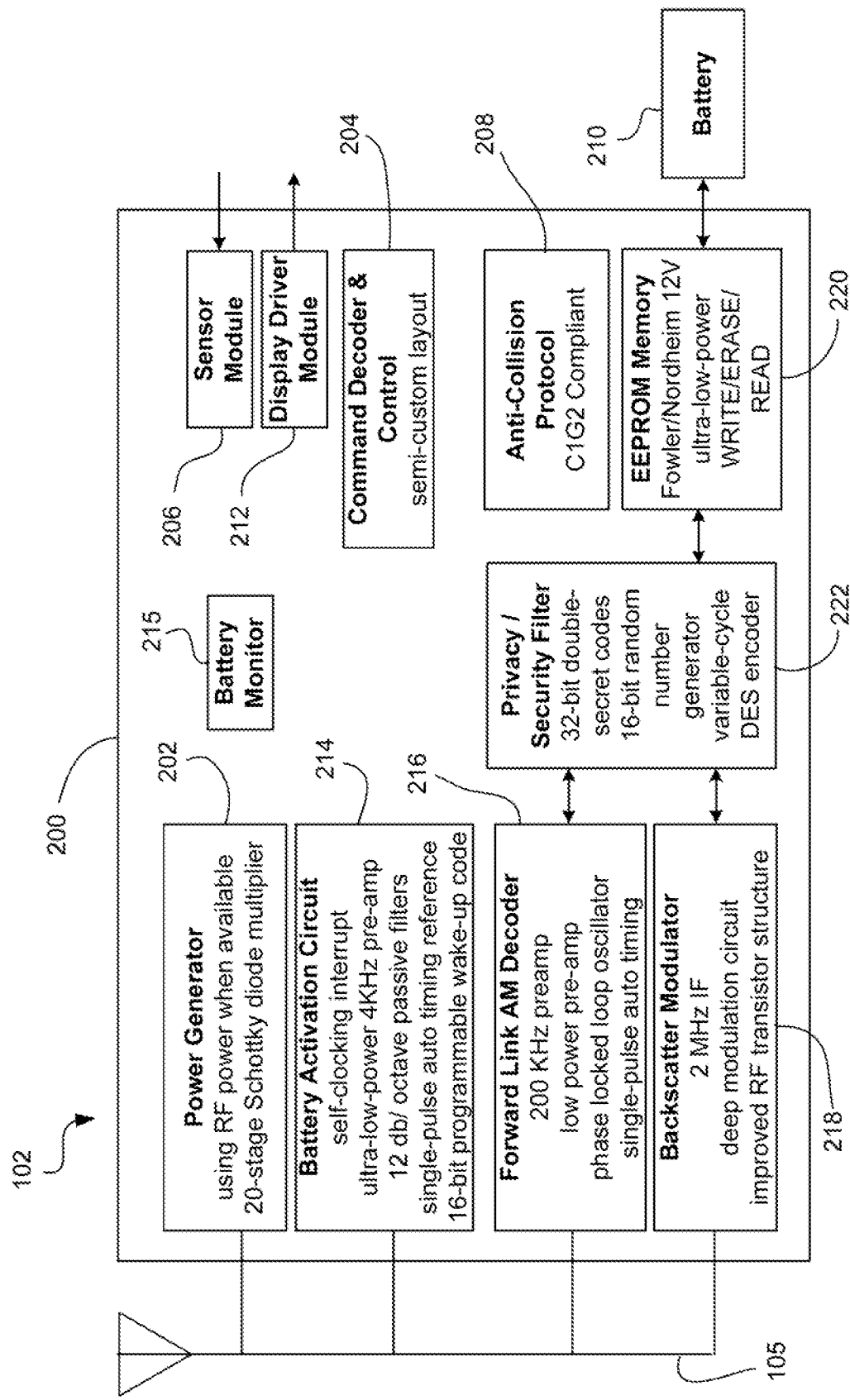
FIG. 2 is a system diagram for an illustrative integrated circuit (IC) chip for implementation in an RFID device.

Embodiments of the RFID device are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID tag 102. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the chip 200 includes several circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

Preferably, the amount of memory available on the chip or otherwise is adequate to store data such that the external device need not be in active communication with the remote device.

The module 200 may also incorporate a security encryption circuit 222 for operating under one or more security schemes, secret handshakes with readers, etc.

The RFID device may have a dedicated power supply, e.g. battery; may draw power from a power source of the electronic device (e.g., battery, AC adapter, etc.); or both. Further, the RFID device may include a supplemental power source. Note that while the present description refers to a "supplemental" power source, the supplemental power source may indeed be the sole device that captures energy from outside the tag, be it from solar, RF, kinetic, etc. energy.

In various embodiments, RFID technology may be used for a variety of applications including security access, entrance/exit monitoring, high value asset monitoring, etc. The combination of RFID communication with media capture provides useful functionality. The term "media" as used herein refers to one or more of image, video (e.g., motion picture), and audio data. For example, combining RFID reader antennas with cameras and/or other media capture devices enables the ability to trigger the cameras to record only desired events and/or record images in the direction the event is occurring. In other embodiments, the ability to find tags using visual supplemental identification and/or confirmation can improve reliability, thereby overcoming challenges typical of RF searching, which is challenging due to multipath and other RF distortions.

RFID readers require one or more antennas to transmit and/or receive RF signals to communicate with tags. By adding a capture device (such as one or more of a digital camera operating in the visible and/or invisible spectra to take one or more of still photographs and video recordings; an audio recorder to take audio clips; etc.) inside the reader, outside the reader, or coupled to one or more antennas, a visual and/or audible recording of an RFID event can be stored, e.g., with an event log.

A media capture device may simply transduce light and/or sound to an analog signal, a digital signal, or some other computer readable format. The media capture device may or may not further process the transduced output. A media capture device may also store the resulting media data, in some embodiments.

While much of the description herein refers to a camera taking a picture, this has been done merely to assist the reader in understanding the concepts set forth herein and to present various embodiments in a context. It should be kept in mind that any media capture device or combination of devices with its respective functionality may be used in place of, or in combination with, a camera. Moreover, a "picture" or "image" may include still pictures and/or video. Also, an audio clip may be created instead of, or in combination with, a picture.

Figure 3:
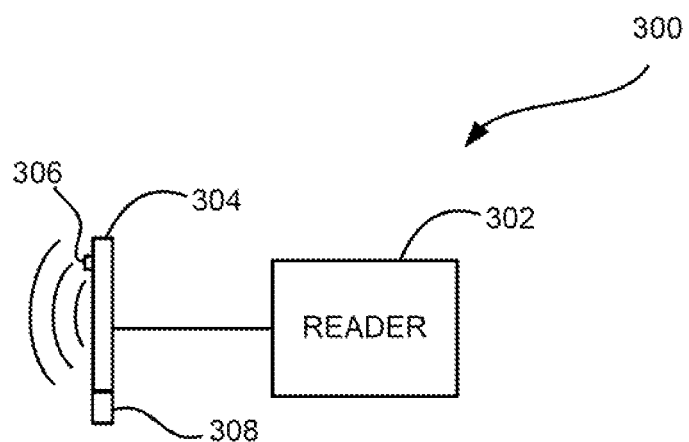
FIG. 3 is a diagram of a system according to one embodiment.
Figure 4:
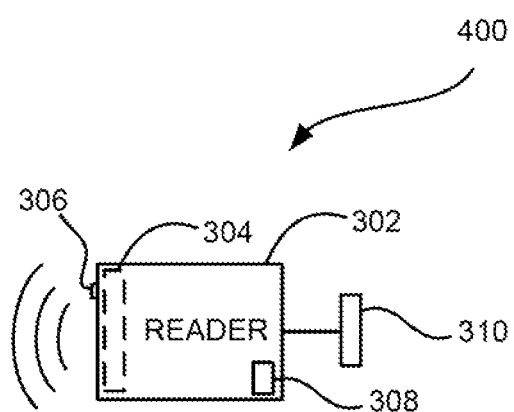
FIG. 4 is a diagram of a system according to one embodiment.

FIG. 3 illustrates a system 300 according to one embodiment. As shown, an RFID reader 302 is coupled to an antenna 304. In the embodiment shown, the antenna is not part of or mounted directly to the reader housing. Such embodiments are particularly useful, for example, at an access door or a port entrance, where a closer proximity of the reader to target tags is desired. In other approaches, however, the antenna may be part of, in, or mounted directly to the reader housing. FIG. 4 illustrates a system 400 according to an embodiment having an antenna in the reader housing.

In FIG. 3, a media capture device 306 is mounted in the antenna housing. The media capture device 306 in various approaches may be of a type known in the art, and may be mounted inside or on an antenna or its housing, in or on the reader as shown in FIG. 4, etc. For example, in further embodiments, the media capture device 306 may be mounted to the reader, while the antenna is separately mounted. Likewise or alternatively, multiple media capture devices, such as a microphone and camera, may be coupled to the antenna and/or reader.

The RFID reader 302 and/or its processor may have a port or jack for interfacing with the media capture device 306 and/or its cabling. Similarly and/or alternatively, the antenna 304 may have a port or jack for interfacing with the media capture device 306 and/or its cabling.

While any type of antenna known in the art may be used in the various embodiments, an RFID reader antenna in one embodiment may have fairly directional reading characteristics. Including a camera with such a directional antenna is desirable because the camera may be set to point in the same direction as the antenna beam, especially where the antenna is directional, as with a patch antenna. This embodiment enables the system to take a picture of what the antenna is communicating with and/or its general vicinity. Moreover, a timestamp can be associated with the resulting media file, e.g., in a table, as metadata, stored with the file, etc. Thus, the constant taking of video is unnecessary; nor would the amounts of data associated with constant video capture need to be stored. Rather, the picture can be retrieved specifically for the approximate and/or exact point in time that the RF communication occurred.

Notwithstanding the embodiment described in the foregoing paragraph, a continuous stream of media can be captured, and a further operation can be performed based on a trigger event, such as any of those described herein. For example, additional data such as a timestamp can be generated and correlated to time data of the media file, thereby allowing a user to quickly jump to the approximate time in the media recording that corresponds to the timestamp so that the video, audio, etc. recorded at the time of the event can be quickly obtained and reviewed. The additional data may be stored with the media file, as a separate file, encoded into the media, etc.

The reader may include memory, e.g., flash memory, a hard disk drive, tape, etc. for storing the media captured by the capture device. The media may also and/or alternatively be stored on a backend system in communication with the reader, remote system, etc. Similarly, the processor of the reader may perform many or all of the operations disclosed herein, and/or a backend system may perform some actions.

The media capture device may include a known camera and/or microphone. The media capture device may also simply include a CCD and lens, with a processor on the reader processing received image data. The media capture device may be mounted anywhere in or on the antenna or reader and/or its housing. In particularly preferred embodiments, the media capture device is mounted near one corner of an antenna housing, facing the same direction as the antenna. This may minimize any effect on the antenna. In some embodiments, one camera may be present in each antenna, multiple cameras may be present on one antenna for stereoscopic applications, etc.

In one embodiment, whether and/or when media is captured and/or stored may be based on detecting or determining a trigger event. A trigger event in one approach is an RFID read event, such as where a particular class of tag is read, a change in signal strength measurements is detected, a tag having a tag ID associated with a trigger command is read, etc. Such embodiments may enable the capture of media upon reading a particular type or class of tag for security and/or traceability issues. For example, if the RFID reader reads a particular tag, such as an identification (ID) badge, and it is desirable to have a video or a photo record of the event, the read can trigger the taking of a picture. Thus, if the badge is worn by a person, the image may capture events such as whether or not that person was followed through a secure doorway by somebody that was not approved to go into an area. In another example, if the tag is on a particular piece of equipment, part, etc., a photo or video may capture an image of the person who took the equipment out of the area.

In yet another example, the interrogator may read one or more tags continuously or semi-continuously (e.g., periodically, at or for predetermined intervals, etc.) and look for signal strength measurement changes from those tags. Such a tag may be stationary and located at a particular location in a room, coupled to a particular item, etc. If the signal strength changes significantly, e.g., greater than 5%, greater than 15%, greater than 25%, then the change may be considered a triggering event. The change in the strength may be caused by someone walking in between the tag and antenna, movement of the tag or tagged item, an object that was between the tag and antenna was moved, a reflection of RF energy caused by someone or something near the RF transmission path, etc.

The trigger event may also be based on an unauthorized presence of the RFID tag in a restricted area. For example, the system may periodically transmit a query in the restricted area, and detection of unauthorized presence of the RFID tag may trigger media capture.

Information about the read event can be stored in association with the media. Examples of such information include the tag ID, a timestamp, etc.

In some embodiments, the media may be automatically processed depending on a particular trigger (e.g., read) event, the type of trigger event, or some other criteria. The media may also or alternatively be processed on demand upon receiving an instruction to perform the processing, e.g., from a user, another system, etc. For example, the reader or an attached system may perform facial recognition of a type known in the art on an image based on a particular RFID tag read. For example, when an ID badge is detected, the system may automatically perform facial recognition to determine whether the face of a person in a captured image matches the person associated with the tagged badge ID by verifying through facial recognition that the person looks like the person who is supposed to have the badge. In another example, voice recognition may be performed to verify an identity of a person holding an RFID badge. In yet another example, the media may be sent or streamed to a remote system such as a security system, in an email message, etc. In some approaches, the facial, voice, etc. recognition may be performed in secret, e.g., the person bearing the ID badge does not know that the recognition process is or will be performed.

In another embodiment, the trigger event may be based on a sensor reading. The tag and/or reader may include a sensor for detecting an environmental condition, the reader determining whether a trigger event has occurred based on a reading of the sensor coupled thereto and/or a sensor reading transmitted by the tag. The sensor may also detect a condition of an object to which attached. Illustrative environmental and/or object conditions include temperature, humidity, Ph, sunlight, ultraviolet light, chemicals, radioactivity, pathogens, presence of bacteria, presence of viruses, presence of prions, carbon dioxide level, and combinations thereof. For example, a trigger event may occur if the sensor reading goes above or below a predetermined threshold, if the sensor reading remains above a threshold for a predetermined amount of time, etc. In one example, if it is determined that the temperature is changing, the system may record media to assist in determining why the temperature was changing.

Other trigger event are possible, as will be apparent to one skilled in the art upon reading the present disclosure, and those presented here are not to be considered limiting.

In another embodiment, the image capture device may be physically or effectively steerable towards a direction of a trigger event such as an RFID read event, e.g., to record an image of a particular location, based on an angle of arrival determination that determines the approximate angle of arrival of the tag relative to some point of reference such as the media capture device, antenna, reader, etc. Known methods of angle of arrival determination may be used such as triangulation, variation in signal strength measurements, detection of a signal by a directional antenna, etc. Yet another approach implements two separate antennas for receiving a signal from the tag. The phase difference of the arriving signal is used to perform the angle of arrival estimation.

In one approach, a camera and/or its lens is physically moved to point towards the area where the tag is determined to be. Steering mechanisms such as actuators, piezos, etc. may be used to effect the movement. The camera may also be caused to zoom in and/or out.

In another approach, digital processing may be used to focus in on a particular area as well. For example, a wide field of view camera may be used, and the system zooms in on different portions of the field, e.g. by selecting a section of the CCD from which to capture the image. Thus, in one approach, rather than zooming in on the middle of the field of view, a portion thereof at the appropriate angle is selected for capture.

In yet another embodiment, the media may be used to verify the estimated angle of arrival. For example, the system may estimate the angle of arrival of the tag and takes a picture of the corresponding area. The system and/or a user may then go back and make sure that the estimated angle of arrival corresponds with what is found in the picture. Moreover, the system may process the media and angle of arrival data to verify that the angle of arrival estimate is accurate or not.

In yet another embodiment, image recognition is used as a trigger event. For example, assume a tag is mounted on something that has a known shape. Known image processing techniques may be used to determine that the shape has become present, and record an image thereof.

In a further embodiment, the image capture device is physically or effectively steerable to record an image based on knowledge of a location of a particular RFID tag and a trigger event such as an RFID read event concerning the tag. For example, the system may read a particular tag and it already knows the particular location of that tag, e.g., its predetermined location, it is mounted to a wall, etc. When a read event is detected, such as changing signal levels, the system may steer the camera or select a portion of the field of view to capture an image of the known location of the tag. As in any embodiment, the particular media captured may optionally be associated with the particular read event, e.g., by time stamping, associating an event code or a sequence number with the media file, adding something that is common to both the image capture and the read event, etc.

In another embodiment, a read event may trigger the system to scan for an optical code of any type known in the art, such as a bar code, 2-D code, custom codes, etc. For example, when the system reads an RFID tag, it may also look for an optical bar code in image data captured by the camera. Further processing may be performed on the code, such as determining what the code represents (e.g., a numerical sequence, etc.), determining what the code corresponds to, determining whether the tagged item corresponds to the RFID tag ID, etc.

The media may be processed in a predefined manner based on a particular RFID read event. For example, the media may be stored to a memory based on a particular RFID read event. In another example, media may be sent to a recipient or system when an unauthorized access is detected.

In yet another embodiment, an RFID read event may trigger the system to cause an alarm, which may simply be a signal, or may include a message and/or the media, to be sent to a predetermined individual, system, and/or entity. In one approach, as a result of processing which may be tied, e.g., to an RFID read event, some other action is caused to happen upon the triggering event. Illustrative actions include sending an alarm to security, sending a distress call, sending a picture to a human operator who can then make a decision of what to do, sending the media to another system for further processing and/or archiving, etc. Any mechanism of a type known in the art may be used to implement such embodiments.

In further examples of use, a visual recording can be used for post analysis such as criminal analysis or legal proceedings. Visual images can also be used for real time process monitoring, e.g., in a manufacturing plant, etc.

Additional features may be included in any of the various embodiments. For example, referring to FIGS. 3 and 4, a device 308 or devices 308, 310 for input and/or output may be coupled to the reader 302. Such device 308 may be positioned on the reader 302 as in FIG. 4, on the antenna 304 as in FIG. 3, near the reader as device 310 in FIG. 4, etc.

The output and/or input device may operate in conjunction with the media capture device in any conceivable manner, such as for security applications, to assist in media capture, etc. Several exemplary implementations are presented below. Those skilled in the art, upon reading the present disclosure, will appreciate the plethora of possible applications enabled by the general combination of features.

For example, a flash or other light source may be engaged when a photo is taken to illuminate the location of the image. A visual indicator such as an LED, light, etc. may be engaged to simply indicate that media is being captured. Likewise, a visual indicator such as a red light may be engaged upon detecting an event, such as presence of an unauthorized tag in a particular zone. In another example, a green and red light may be activated to indicate whether a particular tag was successfully read (green light) or not (red light). Moreover, such visual indicator may be used in conjunction with an audible output, such as a siren, audible alarm, verbal warning, etc.

A tactile input interface such as a keypad, touchscreen, etc. may be coupled to any component to receive information from a user, such as a code, ID, etc. For example, when an event is detected, such as a security badge read, the system may request input of a security code via a keypad. In another approach, when an event is detected and a facial recognition is performed on an image of a wearer of badge, and the facial recognition fails to match the image with an entry in the security database, the wearer may be given a warning and asked to enter a code within a predetermined time. If a proper code is entered in the allotted time, access may be granted. If a proper code is not entered in the allotted time and/or an improper code is entered, an alarm may be activated.

A visual display device such as a screen, touchscreen, LCD panel, etc. may be coupled to any component to provide visual, e.g., textual and/or graphical information; alert information; instructions; feedback; output of visual media; etc. Moreover, such visual display device may also receive input, as where a touchscreen is used.

An audible output device such as a speaker may be coupled to any component to provide audible information, instructions, feedback, output of audible media, etc. For example, once a security badge is read and its authorization determined, a speaker may be used to audibly output a request for a spoken word, phrase, password, etc. The badge wearer's spoken response may be captured with a microphone and processed using known techniques such as voiceprint matching, voice recognition, etc.

In any of the embodiments, techniques and/or hardware known in the art may be used to implement the various operations.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein may be implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In particular, methods described herein may be implemented by a series of computer-executable instructions residing on a storage medium such as a physical computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory or medium (e.g., hard disk drive), semiconductor memory (e.g., FLASH memory and other portable memory cards, etc.), etc. A computer readable medium may also include a signal medium such as a wire, network link, wireless link, etc. across which data and/or instructions may be transmitted.

While various embodiments have been described above, it should be understood that they have been presented by way of example only, and not limitation. Thus, the breadth scope of a preferred embodiment should not be limited by any of the above-described exemplary embodiments, but should be defined only in accordance with the following claims and their equivalents.

What is claimed is:

1. A method, comprising:
   reading a plurality of Radio Frequency Identification (RFID) tags using an RFID reader;
   capturing media using a media capture device in response to determining that a trigger event has occurred, the trigger event including at least one of:
   a first type of trigger event wherein a RFID tag of the plurality of read RFID tags is included in a predetermined class of RFID tags, wherein the predetermined class of RFID tags includes one of Class-1 RFID tags, Class-2 RFID tags, Class-3 RFID tags, and Class-4 RFID tags, and
   a second type of trigger event wherein a signal strength of a RFID tag of the plurality of read RFID tags has changed beyond a predetermined threshold;
   performing first processing on the captured media when the trigger event includes the first type of trigger event; and
   performing second processing on the captured media when the trigger event includes the second type of trigger event.

2. The method of claim 1, wherein the media includes audio data, wherein at least one of the media capture device and the RFID reader stores audio data therein.

3. The method of claim 1, wherein the media capture device is embedded in a corner of a housing of the antenna for minimizing an effect of the media capture device on the antenna.

4. The method of claim 1, wherein the media includes image data, and further comprising engaging a light source when the media is captured to illuminate a location corresponding to the image data.

5. The method of claim 1, wherein the RFID reader is configured to read the plurality of RFID tags continuously or semi-continuously and detect signal strength measurement changes from the plurality of RFID tags.

6. The method of claim 1, wherein the media capture device includes a camera operating in an invisible spectra for taking one or more of still photographs and video recordings in the invisible spectra.

7. The method of claim 1, wherein the trigger event is further based on a sensor reading, the sensor being configured to detect an environmental condition.

8. The method of claim 7, wherein the environmental condition is selected from a group consisting of temperature, humidity, Ph, sunlight, ultraviolet light, chemicals, radioactivity, pathogens, presence of bacteria, presence of viruses, presence of prions, carbon dioxide level.

9. The method of claim 1, further comprising making an angle of arrival determination, and steering the media capture device towards a direction of an RFID read event based on the angle of arrival determination.

10. The method of claim 1, wherein media captured by the media capture device is used to verify data corresponding to an angle of arrival.

11. The method of claim 1, further comprising steering the media capture device based on an RFID read event associated with a particular RFID tag and knowledge of a location of the particular RFID tag.

12. The method of claim 1, further comprising storing the media in a memory coupled to at least one of the media capture device and the RFID reader.

13. The method of claim 12, further comprising storing information about an RFID read event with the media.

14. The method of claim 1, further comprising processing the media in a predefined manner based on a particular RFID read event.

15. The method of claim 1, wherein performing at least one of the first processing and the second processing includes performing image facial recognition based on the trigger event.

16. The method of claim 1, wherein performing at least one of the first processing and the second processing includes performing voice recognition based on the trigger event.

17. The method of claim 1, further comprising detecting optical bar codes related to an RFID tag.

18. The method of claim 1, further comprising detecting an RFID read event, and in response thereto, sending an alarm to a predetermined individual, system, and/or entity.

19. The method of claim 1, further comprising outputting at least one of visual and audible output using a device coupled to the RFID reader upon occurrence of the trigger event.

20. The method of claim 1, further comprising receiving at least one of tactile and audible input using a device coupled to the RFID reader upon occurrence of the trigger event.

* * * * *